United States Patent [19]

Tani

[11] Patent Number: 4,936,651
[45] Date of Patent: Jun. 26, 1990

[54] EXTRUDABLE COMPOSITION AND PRODUCTS MADE THEREWITH

[75] Inventor: Yoshimitsu Tani, Ohmiya, Japan

[73] Assignee: EMS -Inventa AG, Domat/Ems, Switzerland

[21] Appl. No.: 360,431

[22] Filed: Jun. 2, 1989

Related U.S. Application Data

[62] Division of Ser. No. 121,476, Nov. 17, 1987, abandoned.

[30] Foreign Application Priority Data

Nov. 17, 1986 [CH] Switzerland ............................ 4588/86

[51] Int. Cl.$^5$ ............................ G02B 6/00; G02B 6/44
[52] U.S. Cl. ................................. 350/96.34; 350/96.23
[58] Field of Search ............................ 350/96.34, 96.30

[56] References Cited

U.S. PATENT DOCUMENTS

| | | | |
|---|---|---|---|
| 4,469,409 | 9/1984 | Nakano et al. | 350/341 |
| 4,537,924 | 8/1985 | Rombusch et al. | 524/103 |
| 4,611,025 | 9/1986 | Akkapeddi et al. | 524/449 |
| 4,857,080 | 8/1989 | Baker et al. | 55/16 |

Primary Examiner—William L. Sikes
Assistant Examiner—Akm E. Ullah
Attorney, Agent, or Firm—Bierman and Muserlian

[57] ABSTRACT

The invention relates to thermoplastically processible mixtures comprising from 0 to 95% by weight of polyamide and from 50 to 5% by weight of polyamide elastomers, especially for the production of polymeric protective layers for optical waveguides. Optical waveguide cables can be produced at higher rates with these mixtures than when using, for example, polyamide 12 alone as the protective layer. The optical waveguide cables thus obtained are distinguished by comparatively low attenuation values even with high mechanical loads.

8 Claims, 1 Drawing Sheet

EXTRUDABLE COMPOSITION AND PRODUCTS MADE THEREWITH

PRIOR APPLICATION

This is a division of U.S. patent application Ser. No. 121,476 filed Nov. 17, 1987, now abandoned.

The present invention relates to thermoplastically processable mixtures of polyamide-12, polyamide elastomers and further polyamides and/or copolyamides, especially for use in the production of polymeric protective layers for optical waveguides. The protective layers are produced, in particular, by extrusion and are joined in an appropriate manner to the optical waveguides. Further layers composed of polymers or other materials may also be provided to form optical waveguide cables.

BACKGROUND OF THE INVENTION

Fibers for optical transmission are generally composed of a special optical glass which is a brittle material. To improve its inadequate mechanical strength, it is generally provided with a lacquer-like covering and a plastic sheath. However, the optical fiber cable thus obtained, which is composed of a glass fiber core and surrounding sheaths, still has various shortcomings. For example, breakages often occur in the cores, and their transmission properties are impaired by external pressures, impacts or bending stresses. Other suitable sheathing materials have thus been sought for some time in order to overcome these deficiencies.

Optical fibers composed of a core and a sheath made up from one or more layers are known. For example, they may be produced by the process described in U.S. Pat. No. 3,980,390 in which a glass fiber spun from a melt index is provided, before it comes into contact with other solid substances, with a resin coating on which a further coating composed of a thermoplastic resin composition is applied by melt extrusion. The first coating of the resin composition, hereinafter called the primary coating, is applied to the surface of the fiber directly after it has been spun and serves to assist in maintaining the original strength of the glass material. The subsequently applied coating is composed of a thermoplastic resin composition, hereinafter called the secondary protective layer, which is applied by extrusion and provides protection against mechanical stresses, moisture, ultraviolet radiation, etc. An optical cable produced by this process, with a sheath composed of two layers, is shown in FIG. 1 of the accompanying drawings. This Figure shows glass fiber core 1, primary coating 2, and secondary protective layer 4.

It is already known from D. Gloge et al "Optical Fiber Packaging and Its Influence on Fiber Straightness and Loss (BSTJ, Vol. 54, 1975, pages 245 to 262) or J. Geisler et al. "Optical Fibers" (Appl. Technical Ser. V/S 120 uf. Pergamon Press, 1986), that the transmission properties of optical fibers are subject to marked variations as the result of microbending. The resultant transmission losses are usually given in dB/km.

There have, therefore, been attempts to improve the double-layered structure of the sheath of the optical fiber of FIG. 1. A typical example is shown in FIG. 2, wherein there is provided, between primary coating 2 and secondary layer 4, buffer layer 3 of a material which can absorb external stresses or strains and is composed, for example, of polyisobutenes, certain gels, foamed plastics, an ethylene/vinylacetate copolymer, a conventional commercial silicone resin, or a rubber-like material.

In a further industrial design, the internal diameter of the secondary protective layer is larger than the external diameter of the primary coating to produce a space between the two coatings. A cable of this type is shown in FIG. 3 of the accompanying drawings.

In a still further industrial design, the secondary layer is designed as a flat strip in which the optical fibers are arranged next to one another in parallel rows (see FIG. 4). The advantage of this design resides in the fact that a large number of optical guides lie next to one another in a strip and several such strips can be arranged on top of one another to allow a flexible method of construction.

The optical cables of types shown in FIGS. 1 to 4 are distinguished in that the fiber core is mechanically isolated, by the primary coating and optionally the secondary protective layer, from external mechanical forces as well as internal or external stresses caused by the differing coefficients of thermal expansion of the various materials of which the optical cable is composed. Investigations have shown that, in contrast to cables according to FIGS. 1 and 4, a lesser increase in transmission losses resulting from external pressure or lower temperatures is observed in cables according to FIGS. 2 and 3. Owing to the space between the primary coating and secondary layer, the cable according to FIG. 3 also has high resistance to microbending which occurs as the result of the external force or internal thermal stresses. Shrinkage of the secondary layer in the longitudinal direction may lead to coiling of the optical fibers without causing transmission losses.

Thermoplastic resins which may be extruded as melts are known for producing the secondary protective layer. Polyamides, polyesters, polyolefins, and fluorine polymers, in particular, have been used, as these materials are easily extruded, are very resistant to weathering, and have high mechanical strength. It is particularly advantageous to use polyamides which have a relatively low coefficient of thermal expansion and low water absorption capacity which are also those used for the coating of electric wires.

Various investigations have shown that polyamide-12 resins can be used successfully for producing the secondary protective layer for optical fibers. Such fibers are substantially free from variations in the transmission losses occurring as the result of microbending; i.e. those resulting from the application of the secondary protective layer by extrusion and those caused by external stresses which occur during sheathing, installation, or cable laying. Optical fibers which have a coating of polyamide 12 and related copolyamides whose moduli of elasticity are between 200 and 2200 N/mm$^2$ at room temperature are known from DE-OS 25 12 312; 27 23 587; 27 24 155; and 31 44 182; DE-PS 29 14 555; and JP 14 82 10/78.

In addition to their resistance to microbending, the optical fibers must also have stable transmission properties at temperatures of −30° to +60° C. and must maintain their properties even if they are used, for example, as underwater cables where they are subjected to high water pressures.

This effect can be achieved if a sheathing material having a high modulus of bending elasticity is selected; this will ensure a sufficiently high resistance to transverse pressure. However, suitable materials frequently have viscosities, such that production of the secondary protective layer cannot be carried out at a satisfactory rate by extrusion. Materials which have a high level of the desired qualities and, at the same time, allow high processing speeds are therefore desired for inexpensive and industrially simple production.

Therefore, an object of the invention is to overcome the above-mentioned disadvantages of such cables and, more particularly, to improve (1) the viscosity-dependent irregular thicknesses of the applied plastic coatings, (2) inadequate resistance to pressure and to buckling, (3) excessive water absorption capacity, (4) reduced resistance to microcracks with a small bending radius, (5) defective dimensional stability due to after-crystallization of the polymer, and (6) inadequate mechanical strength. All of the foregoing increase the transmission loss and also increase the cost of production owing to the excessively low extrusion rate of the known materials.

DETAILED DESCRIPTION OF THE INVENTION

This object is achieved by using thermoplastically processible mixtures comprising
(I) from 0 to 95% by weight of at least one polyamide and
(II) from 50 to 5% by weight of at least one polyamide elastomer
for the production of polymeric protective layers of optical waveguides. The polymeric protective layers to be used according to the invention are preferably produced by extrusion and joined in an appropriate manner to the optical waveguides. Also, further layers composed of polymers or other materials may be provided to form optical waveguide cables. The mixtures of components I and II are preferably used for producing secondary protective layers of such waveguides.

The polyamide I may be obtained by polycondensation or polymerization of $\omega$-aminocarboxylic acids (such as $\omega$-aminocaproic acid, $\omega$-aminoundecanoic acid and, in the case of copolyamides, $\omega$-aminolauric acid) and lactams (such as caprolactam and laurolactam), or by reaction of monomers which react with one another to form polyamides (such as a diamine and a dicarboxylic acid), or from mixtures of the above-mentioned compounds. Most suitable is polyamide 12.

Particularly suitable as diamines are hexamethylenediamines; nonamethylenediamines; decamethylenediamines; dodecamethylenediamines; 2,2,4- and 2,4,4-trimethylhexamethylenediamines; isophorone diamine; bis-(aminocyclohexyl)alkanes and derivatives thereof; and xylylenediamines. As dicarboxylic acids, adipic acid, suberic acid, azelaic acid, sebacic acid, dodecanedioc acid, brassic acid, dimerised fatty acids, terephthalic acid, substituted and unsubstituted isophthalic acid, and cyclohexanedicarboxylic acid, are worthy of mention.

The term polyamide 12 includes all materials which are obtained by known processes for polymerization of laurolactam or polycondensation of $\omega$-aminolauric acid. The polyamide 12 may also contain relatively small proportions (usually about 0.1 to 5% by weight) of molecular radicals originating from chain length regulators; i.e. substances which limit the molecular weight to specific values. Dicarboxylic acids or diamines, for example, are suitable for this purpose.

The relative viscosity of the polyamide 12 which is to be used according to the invention is a gauge of its molecular weight and is advantageously between 1.4 and 2.1, preferably between 1.5 and 1.8, measured in m-cresol in accordance with DIN 53727.

The polyamide elastomers (II), which represent a substantial constituent of the mixtures to be used according to the invention, comprise polyether amides and/or polyetherester amides. They advantageously can originate either from the class of polyether amides of the type described, for example, in DE-OS 30 06 961 or in CH-PS 656,135, or from the class of polyetherester amides, according to DE-OS 29 36 977 or DE-OS 34 28 404. The polyether amides can be produced by known processes from
(a) $\omega$-amino carboxylic acids or lactams containing more than 10 carbon atoms,
(b) $\alpha,\omega$-diaminopolyalkylene oxides having molecular weights of 230 to 2500, of which the alkylene radicals are linear or branched and contain at least 3 carbon atoms, and
(c) amounts of dicarboxylic acids containing from 6 to 36 carbon atoms which are equimolar with (b).

These polyetheramides can also contain a small quantity of molecular radicals resulting from mono- or tricarboxylic acids or from mono- or triamines. The proportion of polyalkylene oxide units originating from (b) (polyether blocks) in the polyetheramide is preferably from 5 to 60%, more preferably from 10 to 45%, by weight based on the total weight of the polyether amide. The relative viscosity of the polyetheramide advantageously is between 1.4 and 2.1, preferably between 1.5 and 1.9, in m-cresol according to DIN 53,727. The preferred composition is that wherein (a) comprises laurolactam; (b) comprises $\alpha,\omega$-diaminopolyalkyleneoxide, especially polyoxypropylene-1,2-diamine, and (c) comprises a dimerized fatty acid. It is most preferred that this group of compounds be used with polyamide 12.

The polyetherester amides, which can also be used as polyamide elastomers (II), can be produced from
(a) $\omega$-aminocarboxylic acids or lactams containing more than 10 carbon atoms,
(b) $\alpha,\omega$-dihydroxypolytetrahydrofurans having molecular weights between 160 and 3000, and
(c) amounts of dicarboxylic acids which are equimolar with (b).

The proportion of polytetrahydrofuran units derived from (b) in the polyetherester amide is 5 to 50%, preferably 10 to 45%, by weight based on the total weight of the polyetherester amide. The relative viscosity is desirably 1.4 to 2.1, preferably 1.5 to 1.9, in m-cresol according to DIN 53,727.

The polyamide elastomers II are known as block or copolyamides with elastomeric segments as is set forth in U.S. Pat. No. 4,268,661. These segments are usually ethers or etheresters and can be made up of mono- or polymer elastomeric units. Particularly suitable are polyalkylene oxides, polyols, or diaminopolyols combined with diacids. The mixtures of the present invention can be used in the form of granulates (dry blends) or as polymer alloys to produce polymeric protective layers of optical waveguides by extrusion. Additives such as antioxidants, UV-stabilizers, dyes, pigments, lubricants, etc. can obviously also be added in the usual quantities.

Advantageously, the composition contains 65% to 95% I and 35% to 5% II, preferably, 75% to 95% I and 25% to 5% II, most preferably, about 83% I to 17% II.

When the described mixtures of I and II are used according to the invention for the production of secondary protective layers, a combination of advantages is achieved which shows that these products possess a surprising set of properties which makes them particularly suitable as optical waveguide protective materials. These advantages include:

(1) Very high extrusion rates of, for example, 250 m/min and higher, owing to the low viscosity of the mixtures used according to the invention. This is possible with comparison products such as polyamide 12 only with a marked deterioration in the general level of quality.

(2) As the extrusion rate increases, the light transmission loss (attenuation) increases only slightly and to a far lesser extent than with comparison products such as polyamide 12. This discovery is of decisive importance for optical waveguide sheaths.

(3) Owing to the only slight variation of the modulus of bending elasticity over a wide temperature range, this property is substantially independent of temperature and good resistance to transverse pressure and buckling are achieved.

(4) As a result of the increase in the extrusion rate, the crystallization tendency of the material diminishes markedly, and an improvement is thus achieved in the dimensional stability of the product. Stresses which increase attenuation are released in optical waveguide cables by polymers which crystallize after forming, such as polyamide 12.

(5) Substantially less pressure-sensitivity is found in the optical waveguide sheath than in those made from materials such as polyamide 12, as the extrusion rate increases and the attenuation values remain constant.

(6) Greater flexibility and an improved restoring capacity are achieved owing to the polyamide elastomer content; these properties are advantageous for certain optical waveguide cables.

(7) Water permeability which is 20 to 25% lower than those of "corresponding" polyamide 12 products of similar viscosity is achieved due to the polyamide elastomer content.

In the accompanying drawings, constituting a part hereof and in which like reference characters indicate like parts, FIG. 1 is a section of a double layered optical fiber;

Figure 1:
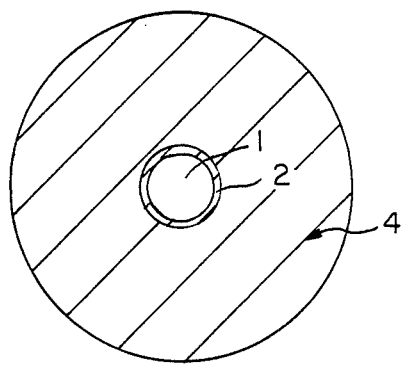
Figure 2:
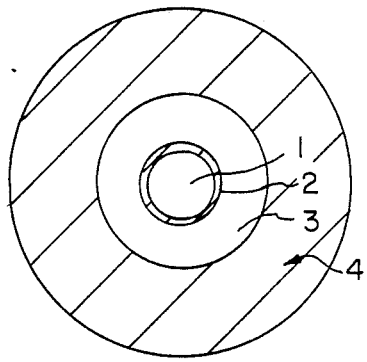
FIG. 2 is a view similar to FIG. 1 of a fiber having a buffer layer between the primary and secondary coatings.
Figure 3:
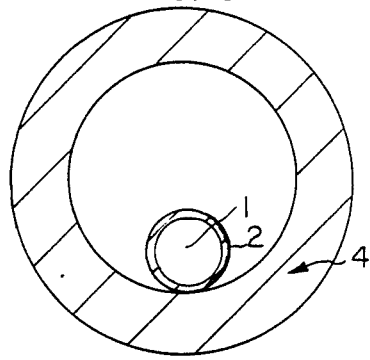
FIG. 3 is a view similar to FIG. 1 of a cable having a space between the primary coating and the secondary coating.
Figure 4:
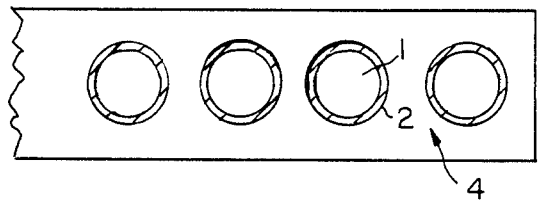
FIG. 4 shows a design in which the secondary coating is a flat strip.

The following examples illustrate the uses according to the invention of mixtures of I and II for the production of polymeric protective layers of optical waveguides. The respective mixtures can also be used for other applications, for example, for the production of other protective layers and shaped articles, in particular those having very thin walls, by traditional processing methods, i.e. extrusion and injection moulding.

EXAMPLE 1

This example illustrates the constant dimensions of a tube of small cross-section which has been produced by extrusion at low to very high take-off speeds using, according to the invention, an 83:17 mixture by weight of polyamide 12 (I) and a polyamide elastomer (II). The polyamide 12 (I) used was obtained by a known method of polymerization of 99.4 parts by weight of laurolactam and 0.6 parts by weight of adipic acid, and had a relative viscosity of 1.6.

The polyamide elastomer (II) was produced in a similar manner from 65.6 parts by weight of laurolactam, 19.5 parts by weight of dimerised fatty acid (Pripol 1014 manufactured by UNICHEMA, Emmerich), 14.35 parts by weight of polyoxypropylene diamine having a molecular weight of 420 (Jeffamin D 400 manufactured by TEXACO), 0.3 parts by weight of polyoxypropylene triamine having a molecular weight of 450 (Jeffamin T 403 manufactured by TEXACO), in the presence of 0.25 parts by weight of a conventional commercial sterically hindered phenol as antioxidant (Irganox 1098 manufactured by CIBA-GEIGY, Basel), and had a relative viscosity of 1.65. The components I and II, premixed in the melt in the specified ratios, were processed on a single-screw extruder (manufactured SCHWABENTHAN, Berlin) with a screw diameter of 45 mm and a L/D ratio of 25 at a melt temperature of 220° to 245° C. to form a tube having an external diameter of 2.5 mm and an internal diameter of 2.2 mm. The take-off speed could be increased from 50 m/min to 270 m/min without any change in the dimensions of the tube. The dimensions of the tube were therefore independent of the take-off speed.

COMPARISON EXAMPLE 1

A tube was produced from the polyamide 12 from Example 1 on the same extruder as in Example 1 under substantially the same extrusion conditions. The dimensions of this tube were also adjusted to an external diameter of 2.5 mm and an internal diameter of 2.2 mm. However, perfect tubes could be obtained up to a take-off speed of only 160 m/min. Problems arose at higher take-off speeds; for example, the diameter of the tube varied and it frequently collapsed. The production of a tube of polyamide 12 having a relative viscosity of 1.65 (the commercial product) produced similarly undesirable results.

EXAMPLE 2

A glass fiber, coated primarily with a silicone resin of was provided with a secondary polymeric protective layer (sheath) of the elastomer mixture of Example 1 on the test apparatus described in more detail below. The diameter of the glass fiber was 125 μm and the thickness of the primary protective layer 140 μm.

COMPARATIVE EXAMPLES 2 AND 3

For comparison purposes, the same glass fiber was also sheathed with the polyamide 12 of Comparison Example 1. In Comparison Example 2, the polyamide 12 was made from lauric lactam and adipic acid and had a relative viscosity of 1.6; in Comparison Example 3, a conventional commercial polyamide 12 having a relative viscosity of 1.65 was used.

The test apparatus was made up of a stress regulator, a single screw extruder manufactured by MAILLEFER and having a transverse injection head (screw diameter 45 mm and L/D ratio 24); a device for controlling the cross-section of the secondarily sheathed glass fiber; a cooling zone with two water baths at 40° and 15° C., respectively; a blower for removing retained water; a take-off device; and winding units with bobbins for the finished optical wavelength cable.

The glass fibers were sheathed with the above-mentioned mixtures at various glass fiber input speeds and glass fiber cable take-off speeds.

The following determinations were made on the finished glass fiber cables:

(1) Optical transmission loss (=attenuation) at −30° C. in dB/km for 1300 m wavelength after the optical waveguide cable had been exposed twice to the following temperature cycle: 1 hour at 20° C., 1 hour at −30° C., and 1 hour at 60° C.

(2) External load sufficient to cause 0.01 dB/km attenuation.

(3) Attenuation as a function of the bending radius at 20° C.

The following results were obtained:

TABLE 1

Light transmission loss at −30° C. as a function of the extrusion rate after the above-mentioned temperature cycle

| Extrusion rate [m/min] | Attenuation [dB/km] | | |
|---|---|---|---|
| | Example 2 | Comparison Example 2 | Comparison Example 3 |
| 50 | 0.02–0.17 | 0.11–0.98 | 0.1–0.40 |
| 100 | 0–0.08 | 0.08–0.32 | 0.08–0.18 |
| 150 | 0–0.06 | 0.08–0.28 | 0.08–0.15 |
| 200 | 0–0.05 | 0.08–0.20 | 0.08–0.10 |

The specified values represent minima and maxima of 10 measurements in each case.

The values show that the transmission loss decreases in all cases as the extrusion rate increases, but that particularly low values are obtained when using the polymer mixture of polyamide 12 and the polyamide elastomer. This polymer mixture could be processed at higher extrusion rates than those specified (for example, 250 and even 300 m/min), and this was not possible when using the comparison products.

TABLE 2

External load which causes attenuation of 0.01 db/km as a function of the extrusion rate

| Extrusion rate [m/min] | Attenuation [dB/km] | External load per glass fibre cable length [kp/mm] | | |
|---|---|---|---|---|
| | | Example 2 | Comparison Example 2 | Comparison Example 3 |
| 50 | 0.01 | 1.5 | 1.2 | 1.2 |
| 100 | 0.01 | 1.4 | 1.1 | 1.0 |
| 150 | 0.01 | 1.3 | 1.0 | 0.9 |
| 200 | 0.01 | 1.3 | 0.9 | 0.9 |

Table 2 shows that waveguide cables produced using polyamide 12/polyamide elastomer mixture will withstand a higher load in producing the same attenuation than the comparison materials. Moreover, the loadability of the optical waveguide cables generally decreases as the extrusion rate increases, but to a much lesser extent in the case of cables with the polymer mixture as secondary protective layer.

TABLE 3

Bending radius which causes attenuation of 0.01 dB/km as a function of the extrusion rate

| Extrusion rate [m/min] | Attenuation [dB/km] | Bending radius [mm] | | |
|---|---|---|---|---|
| | | Example 2 | Comparison Example 2 | Comparison Example 3 |
| 50 | 0.01 | 15 | 30 | 30 |
| 100 | 0.01 | 20 | 25 | 30 |
| 150 | 0.01 | 20 | 25 | 30 |
| 200 | 0.01 | 20 | 25 | 25 |

Table 3 shows that the optical waveguides of Example 2 allow the smallest bending radii. The term "smallest bending radius" means the radius of the smallest loop of the cable at which no further damage occurs, for example, buckling or microcracks, which would lead to transmission losses. This simplifies installation of those optical waveguides which have been produced using the polyamide 12/polyamide elastomer mixture as the secondary protective layer.

I claim:

1. An optical fiber cable comprising a glass fiber core, an intermediate coating selected from the group consisting of lacquer like coatings, resins and air and a secondary outer protective layer of an extruded composition consisting of (A) 50 to 95% by weight of at least one polyamide and (B) 50 to 5% by weight of at least one member of the group consisting of polyether amides and polyether ester amides.

2. A cable of claim 1 wherein the polyamide is polyamide 12.

3. A cable of claim 1 wherein B is a polyetheramide which is a reaction product of
   (a) an ω-aminocarboxylic acid, or a lactam thereof, having more than 10 carbon atoms;
   (b) an α,ω-diaminopolyalkylene oxide having a molecular weight of 230 to 2500, the alkylene radicals being linear or branched and having at least 3 carbon atoms; and
   (c) an amount of a dicarboxylic acid having 6 to 36 carbon atoms which is equimolar to (b).

4. A cable of claim 1 wherein B is a polyetheresteramide which is the reaction product of
   (a) an ω-aminocarboxylic acid, or lactam thereof, having more than 10 carbon atoms;
   (b) an α,ω-dihydroxypolytetrahydrofuran having a molecular weight of 160 to 3000; and
   (c) an amount of a dicarboxylic acid which is equimolar to (b).

5. A cable of claim 1 wherein B has a relative viscosity of 1.4 to 2.1.

6. A cable of claim 1 wherein B has a relative viscosity of 1.5 to 1.9.

7. A cable of claim 1 wherein B is 5 to 60% by weight of the polyetheramide.

8. A cable of claim 1 wherein the outer protective layer has a diameter larger than the intermediate coating diameter.

* * * * *